United States Patent
Miyagawa

(10) Patent No.: US 9,239,235 B2
(45) Date of Patent: Jan. 19, 2016

(54) THREE-DIMENSIONAL MEASURING APPARATUS, THREE-DIMENSIONAL MEASURING METHOD, AND THREE-DIMENSIONAL MEASURING PROGRAM

(71) Applicant: CANON KABUSHIKI KAISHA, Tokyo (JP)

(72) Inventor: Hiroshi Miyagawa, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/388,486

(22) PCT Filed: Mar. 22, 2013

(86) PCT No.: PCT/JP2013/001944
§ 371 (c)(1),
(2) Date: Sep. 26, 2014

(87) PCT Pub. No.: WO2013/145665
PCT Pub. Date: Oct. 3, 2013

(65) Prior Publication Data
US 2015/0049345 A1 Feb. 19, 2015

(30) Foreign Application Priority Data
Mar. 30, 2012 (JP) ................. 2012-079950

(51) Int. Cl.
*G01B 11/24* (2006.01)
*G01B 11/14* (2006.01)
*G01B 11/30* (2006.01)
*G06K 9/00* (2006.01)
(Continued)

(52) U.S. Cl.
CPC .......... *G01B 11/2522* (2013.01); *G01B 11/002* (2013.01); *G01B 11/005* (2013.01); *G01B 11/2545* (2013.01)

(58) Field of Classification Search
CPC .............. G01B 11/002; G01B 11/2522; G01B 11/005; G01B 11/2545
USPC .................................. 356/602, 625; 382/154
See application file for complete search history.

(56) References Cited

U.S. PATENT DOCUMENTS

| 5,589,942 A | 12/1996 | Gordon |
| 6,028,672 A | 2/2000 | Geng |

(Continued)

FOREIGN PATENT DOCUMENTS

| JP | 2003-42735 A | 2/2003 | |
| JP | 2010065690 | * 6/2011 | ............. G01B 11/25 |

*Primary Examiner* — Tarifur Chowdhury
*Assistant Examiner* — Sunghee Y Gray
(74) *Attorney, Agent, or Firm* — Canon USA Inc. IP Division

(57) ABSTRACT

A three-dimensional measuring apparatus 1 projects slit light from a projector 7 onto a work 2 and a stereo camera 5 captures an image of the work projected by the slit light. A control apparatus 10 of the three-dimensional measuring apparatus 1 temporarily identifies a correspondence between a bright line 4j on a first image of the captured stereo image and a light-section plane 6Pj and projects the bright line 4j onto the light-section plane 6Pj. The bright line projected onto the light-section plane 6Pj is projected onto a second image. The control apparatus 10 calculates the level of similarity between a bright line 4jX projected onto the second image and a bright line on the second image and determines a result of identified correspondence relationship between the bright line 4jX and the bright line on the second image.

5 Claims, 14 Drawing Sheets

(51) Int. Cl.
  *G01B 11/25*  (2006.01)
  *G01B 11/00*  (2006.01)

(56) References Cited

U.S. PATENT DOCUMENTS

2004/0151365 A1  8/2004  An Chang
2008/0249659 A1*  10/2008  Ueyama ........................ 700/245
2008/0319704 A1  12/2008  Forster
2010/0322481 A1*  12/2010  Katano et al. ................. 382/106
2011/0221891 A1*  9/2011  Sonoda ......................... 348/135
2012/0120412 A1*  5/2012  Bellis et al. ................... 356/603
2013/0076857 A1*  3/2013  Kurashige et al. .............. 348/40

\* cited by examiner

THREE-DIMENSIONAL MEASURING APPARATUS, THREE-DIMENSIONAL MEASURING METHOD, AND THREE-DIMENSIONAL MEASURING PROGRAM

CROSS REFERENCE TO RELATED APPLICATIONS

This application is a National Stage filing of International Application No. PCT/JP2013/001944 filed Mar. 22, 2013, which claims the benefit of priority from Japanese Patent Application No. 2012-079950 filed Mar. 30, 2012, the disclosures of each of which are hereby incorporated by reference herein in their entirety.

TECHNICAL FIELD

The present invention relates to a three-dimensional measuring in which a projector projects slit light onto an object to be measured and a captured image of the object to be measured which is projected by the slit light is used.

BACKGROUND ART

A stereo method that uses the principle of triangulation is well known to three-dimensionally measure an object to be measured (hereinafter, simply referred to as a "work") from an image captured by a camera. In the stereo method, generally, an image of the work is captured by a stereo camera that has been calibrated and the work is three-dimensionally measured by using the disparity between left and the right cameras.

On the other hand, when the contrast of the work is low, such as in a case of an uneven portion of a black work, it is known that a light-section method which is a type of the stereo method can be used. In the light-section method, a projector projects slit light onto the work and a three-dimensional measuring is performed by using a captured image of the work which is projected by the slit light. More specifically, in the light-section method, a three-dimensional plane equation of a light-section plane of the slit light to be projected is obtained in advance and an image of a bright line on the work projected by the slit light is captured by a camera. Then, the three-dimensional measuring is performed on the basis of the principle of triangulation from the position of the bright line on the obtained image and the three-dimensional plane equation of the light-section plane obtained in advance.

By the way, in the light-section method, if the number of the slit lights projected from the projector is one, when measuring the entire shape of the work, an image of the work has to be captured a plurality of times while moving the work or the slit light. Therefore, conventionally, a three-dimensional measuring apparatus which projects a plurality of slit lights at the same time from a projector is proposed (see PTL 1) so that the number of times of the image capturing is small when performing the three-dimensional measuring of the work.

Here, when a plurality of slit lights are projected onto the work, to perform the three-dimensional measuring, it is necessary to identifies a correspondence between each of a plurality of bright lines on the captured image and a plurality of light-section planes. Therefore, the three-dimensional measuring apparatus described in PTL 1 uses a color light source in the projector and sequentially changes colors of the bright lines so that the colors of adjacent bright lines (slit lights) are different from each other. The image of the bright lines having different colors is captured by a camera, so that the bright lines and the light-section planes correspond to each other on the basis of the colors of the bright lines.

CITATION LIST

Patent Literature

PTL 1: Japanese Patent Laid-Open No. 2003-42735

SUMMARY OF INVENTION

Technical Problem

However, in the three-dimensional measuring method that identifies a correspondence between the bright lines on the image and the light-section planes by the colors of the bright lines as in the PTL 1, a color light source and a color camera are inevitably required. Therefore, there is a problem that this method cannot be applied to a three-dimensional measuring apparatus that uses a monochrome camera. Also there is a problem that the measurement accuracy is easily affected by the color of the surface of the work because as the number of the colors of the slit light increases, it is necessary to distinguish subtle differences among the colors from the image.

Therefore, the present invention provides a three-dimensional measuring apparatus and a three-dimensional measuring method that can identify a correspondence between the bright lines on the image and the light-section planes by a method different from the method of distinguishing the bright lines by color.

Solution to Problem

The present invention provides a three-dimensional measuring apparatus including a projector that projects slit light onto a work, a first camera that captures an image of the work projected by the slit light, a second camera that captures an image of the work projected by the slit light from a position different from that of the first camera, and a control apparatus that stores a three-dimensional plane equation of a light-section plane of the slit light, identifies a correspondence among a bright line generated on a first image captured by the first camera by projecting the slit light, a bright line generated on a second image captured by the second camera by projecting the slit light, and the three-dimensional plane equation of the light-section plane with each other, and performs three-dimensional measuring of the work by a principle of triangulation by using a correspondence relationship between any of the bright line on the first image, the bright line on the second image, and the light-section plane. The control apparatus temporarily identifies a correspondence between the bright line on the first image and the light-section plane, temporarily projects the bright line on the first image onto the light-section plane in a three-dimensional virtual space, and thereafter projects the bright line onto the second image captured by the second camera through the light-section plane, and identifies a correspondence between the light-section plane and the bright lines on the images of the first and the second cameras on the basis of a level of similarity between the bright line on the first image which is projected onto the second image and the bright line on the second image.

The present invention provides a three-dimensional measuring method in which slit lights are projected from a projector onto a work and three-dimensional measuring of the work is performed by using a captured image of the work projected by the slit lights and three-dimensional plane equations of light-section planes of the plurality of slit lights. The three-dimensional measuring method includes an image acquisition step in which an arithmetic unit acquires a first image and a second image of the work projected by the plurality of slit lights, which are captured from different positions, a step of identifying a set of corresponding bright lines in which the arithmetic unit temporarily identifies a correspondence between each bright line on the first image and one of the light-section planes of the plurality of slit lights, temporarily projects the bright line on the first image onto the corresponding light-section plane in a three-dimensional virtual space, and thereafter projects the bright line onto the second image through the light-section plane, determines whether or not the light-section plane and the bright lines on the first and the second images appropriately correspond to each other on the basis of a level of similarity between the bright line on the first image which is projected onto the second image and the bright line on the second image, and determines a correspondence among each bright line on the first and the second images and the light-section planes, and a measuring step in which the arithmetic unit performs three-dimensional measuring of the work by a principle of triangulation by using a correspondence relationship between any of the bright line on the first image, the bright line on the second image, and the light-section planes.

Advantageous Effects of Invention

According to the present invention, it is possible to project the bright line on the first image onto the second image through a temporarily selected light-section plane and identifies a correspondence between a light-section plane and a bright line on an image on the basis of the level of similarity between the projected bright line and the bright line on the second image.

DESCRIPTION OF EMBODIMENT

Hereinafter, a three-dimensional measuring apparatus 1 according to an embodiment of the present invention will be described with reference to the drawings.

Configuration of Three-Dimensional Measuring Apparatus

Figure 1:
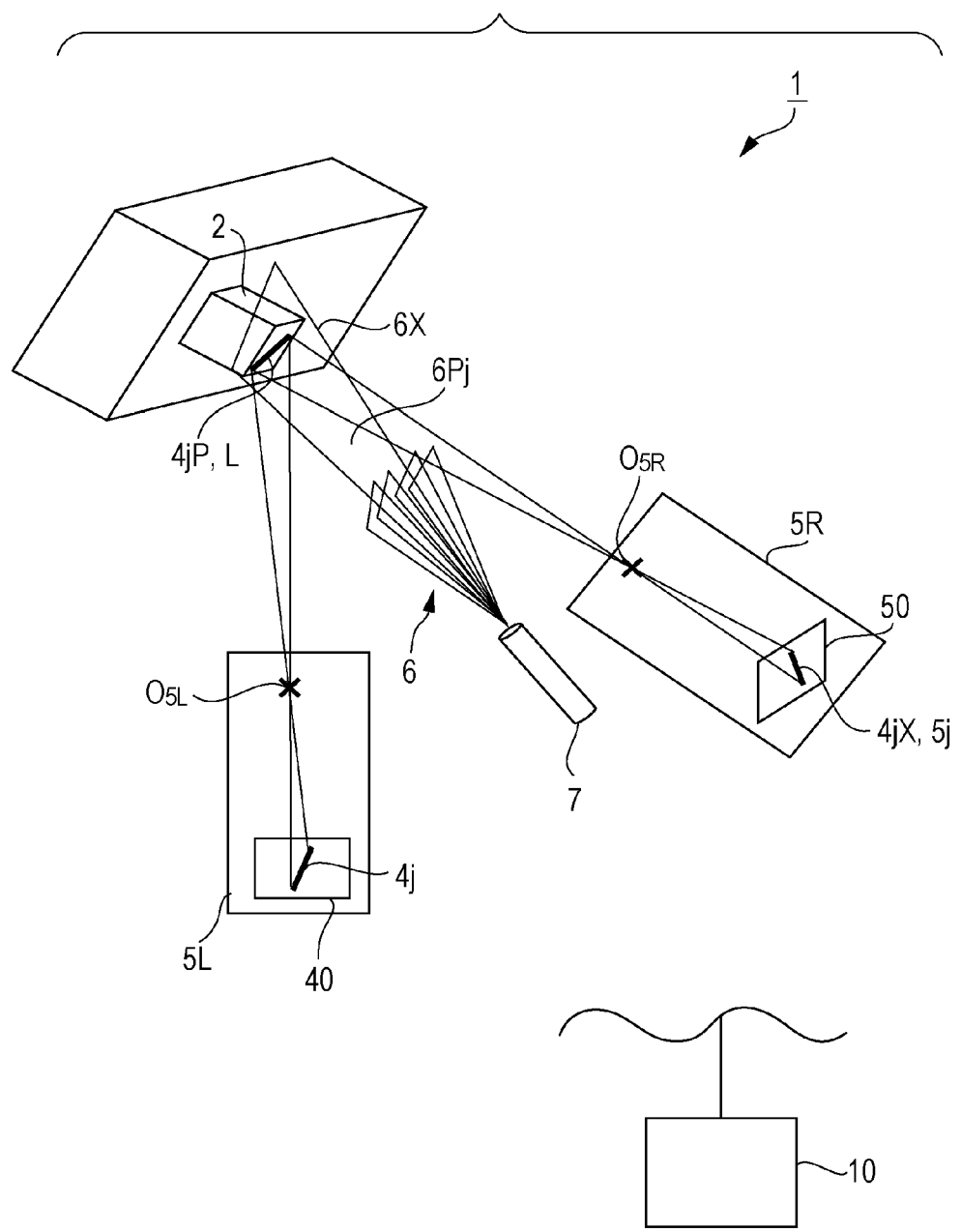
FIG. 1 is a schematic diagram showing a three-dimensional measuring apparatus according to an embodiment of the present invention.
Figure 2:
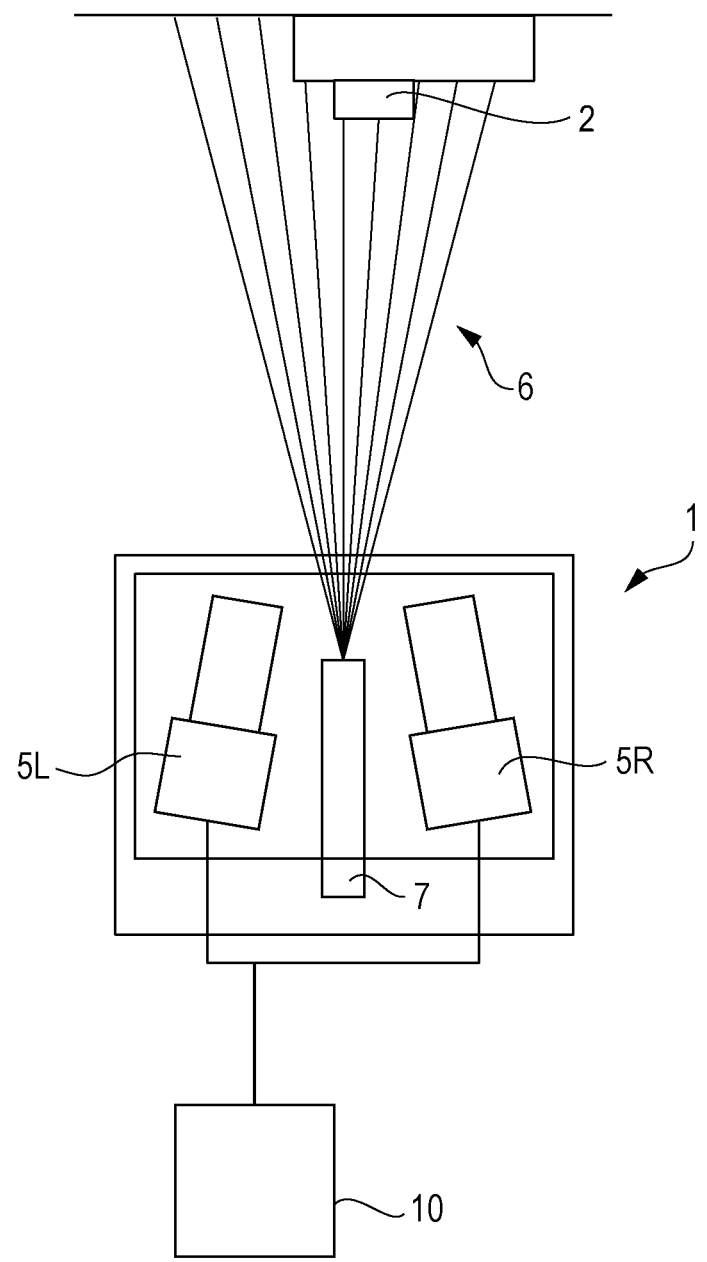
FIG. 2 is a plan view of FIG. 1.

As shown in FIGS. 1 and 2, the three-dimensional measuring apparatus 1 that performs three-dimensional measuring of a work 2 includes a stereo camera 5 that captures an image of the work 2 and a pattern projector 7 that projects multi-slit light 6 onto the work 2. The three-dimensional measuring apparatus 1 also includes a control apparatus 10 to which the stereo camera 5 and the pattern projector 7 is connected.

The stereo camera 5 includes a first camera 5L and a second camera 5R which are monochrome cameras and the pattern projector 7 is configured to project a plurality of single color slit lights 6 onto the work 2 and form a simple stripe pattern on the work. The stereo camera 5 and the pattern projector 7 are disposed so that the visual fields of the first camera 5L and the second camera 5R and a projection range of the pattern projector 7 overlap each other. The work 2 is placed at a position where the visual fields of the camera 5 and the projection range overlap each other. More specifically, the second camera 5R is disposed opposite to the first camera 5L with the pattern projector 7 in between. The first camera 5L and the second camera 5R are disposed so that their positions are different from each other. Further, the pattern projector 7 is oriented so that the multi-slit light 6 is perpendicular to the epipolar constraint of the stereo camera 5.

Figure 3:
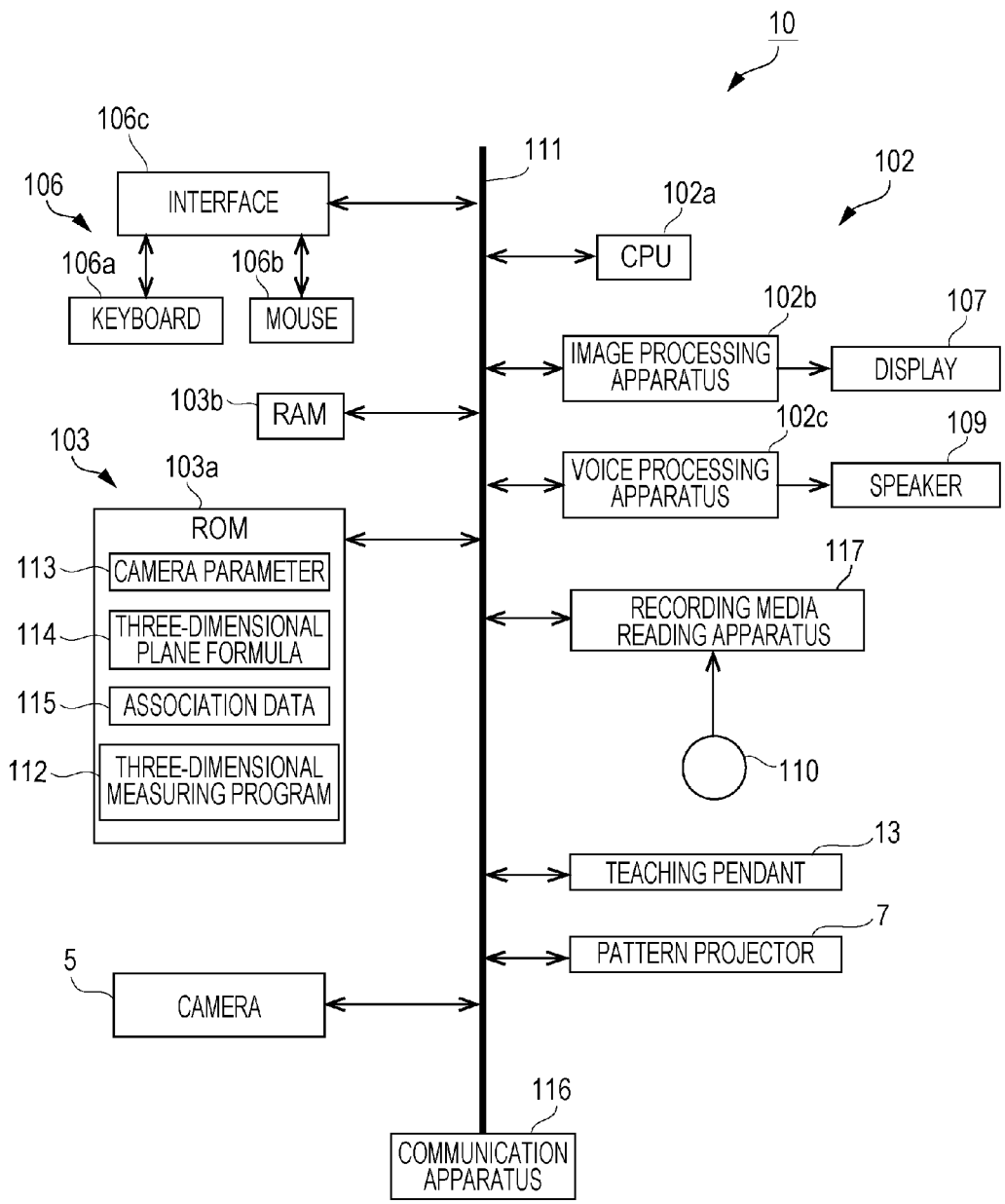
FIG. 3 is a block diagram showing a control apparatus according to the embodiment of the present invention.

As shown in FIG. 3, the control apparatus 10 is configured so that the stereo camera 5 and the pattern projector 7 are connected to a computer main body including an arithmetic unit 102 and a storage apparatus 103. Also an input apparatus 106 for an operator to perform an input operation, a teaching pendant 13, and a display apparatus 107 are connected to the computer main body.

The storage apparatus 103 stores a camera parameter 113 of the stereo camera 5, data 114 of a three-dimensional plane equation of a light-section plane 6Pj of each of the plurality of slit lights 6, candidate index data 115 of the light-section plane 6Pj described later in detail, and the like. Further, the storage apparatus 103 stores various programs such as a control driver of the stereo camera 5 and a three-dimensional measuring program 112 that causes the computer to perform the three-dimensional measuring of the work 2. The camera parameter 113 is a parameter that represents a focal length and a distortion of a lens and a positional relationship between the cameras.

More specifically, the computer main body includes a CPU 102a as a main component, an image processing apparatus 102b, and a voice processing apparatus 102c to form the arithmetic unit 102. In addition to the image processing apparatus 102b and the voice processing apparatus 102c, a ROM 103a and a RAM 103b are connected to the CPU 102a through a bus 111. The ROM 103a stores a program necessary for basic control of the computer as well as various programs such as the above-described three-dimensional measuring program 112 and data. In the RAM 103b, a work area of the CPU 102a is secured. The image processing apparatus 102b controls a liquid crystal display functioning as the display apparatus 107 according to a drawing instruction from the CPU 102a and causes the liquid crystal display to display a predetermined image on a screen thereof. The voice processing apparatus 102c generates an audio signal according to a voice generation instruction from the CPU 102a and outputs the audio signal to a speaker 109.

A keyboard 106a and a mouse 106b which function as the input apparatus 106 are connected to the CPU 102a through an input interface 106c connected to the bus 111, so that it is possible to input specification information necessary to perform the three-dimensional measuring of the work 2 and other instructions.

In addition to the stereo camera 5 and the pattern projector 7, a recording media reading apparatus 117 is connected to the bus 111. Therefore, it is possible to read a recording medium 110 storing the three-dimensional measuring program 112 and the like by the recording media reading apparatus 117 and store the three-dimensional measuring program 112 and the like into, for example, the ROM 103a. The above-described storage apparatus 103 includes another external storage apparatus in addition to the ROM 103a and the RAM 103b which are a main storage apparatus.

Further, a communication apparatus 116 is connected to the bus 111, so that it is possible to download the three-dimensional measuring program 112 delivered from the Internet or the like through the communication apparatus 116 without using the recording medium 110 described above.

In the present embodiment, the control apparatus 10 is configured by a computer to which the stereo camera 5 is connected. However, the control apparatus 10 may be configured in cooperation with an arithmetic unit included in the stereo camera 5 or may be configured by only the arithmetic unit included in the stereo camera 5.

Operation of Three-Dimensional Measuring

Figure 4:
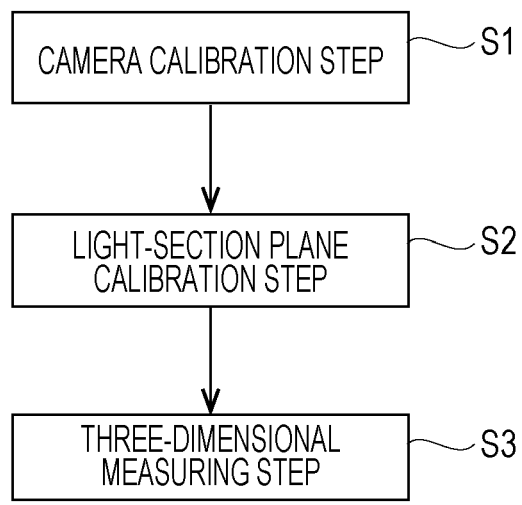
FIG. 4 is a flowchart showing a three-dimensional measuring method according to the embodiment of the present invention.

Next, the three-dimensional measuring of the work 2 based on the three-dimensional measuring program 112 will be described. As shown in FIG. 4, the three-dimensional measuring of the work 2 includes an advance preparation stage including a camera calibration step (S1 in FIG. 4) and a light-section plane calibration step (S2 in FIG. 4) and an actual three-dimensional measuring step (S3 in FIG. 4). In the description below, first, the camera calibration step S1 and the light-section plane calibration step S2 will be described, and thereafter, the three-dimensional measuring step S3 will be described.

When performing the three-dimensional measuring of the work 2, first, the three-dimensional measuring apparatus 1 calibrates the stereo camera 5 (camera calibration step). Specifically, an image of a camera calibration board including a plurality of markers is captured by the stereo camera 5. Since a positional relationship of the markers of the calibration board is measured in advance, the control apparatus 10 of the three-dimensional measuring apparatus 1 compares positions of the markers on the captured stereo image with stored positions of the markers to calibrate the camera parameter 113 of the stereo camera 5 and stores the calibrated camera parameter 113.

In other words, the control apparatus 10 functions as a camera parameter calibration unit that calibrates the camera parameter 113 of the stereo camera 5. To calibrate the camera, an existing method is used (for example, Zhengyou Zhang. A flexible new technique for camera calibration. IEEE Transactions on Pattern Analysis and Machine Intelligence, Vol. 22, No. 11, pp. 1330-1334, 2000.).

Figure 5:
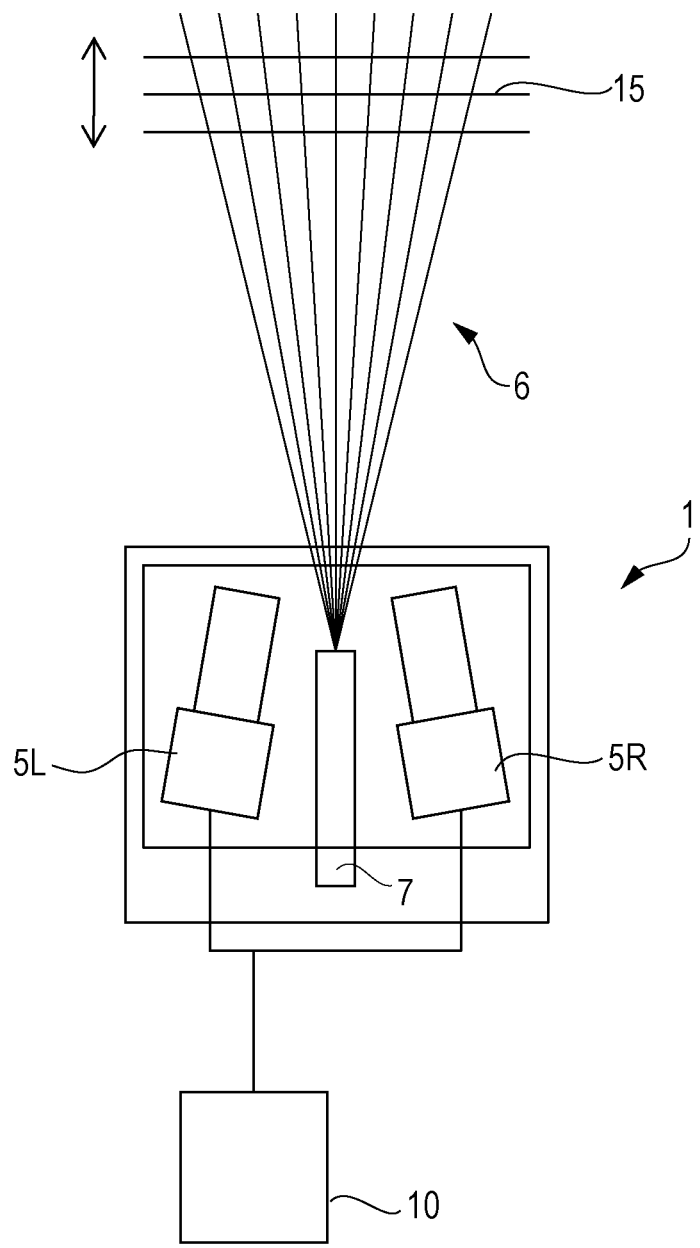
FIG. 5 is a schematic diagram showing the three-dimensional measuring apparatus in a light-section plane calibration step.
Figure 6A:
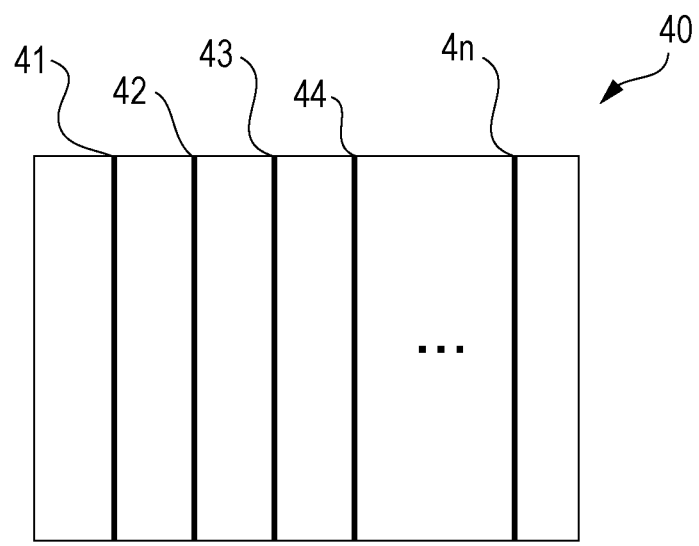
FIG. 6A is a diagram showing an image captured by a first camera in the light-section plane calibration step.
Figure 6B:
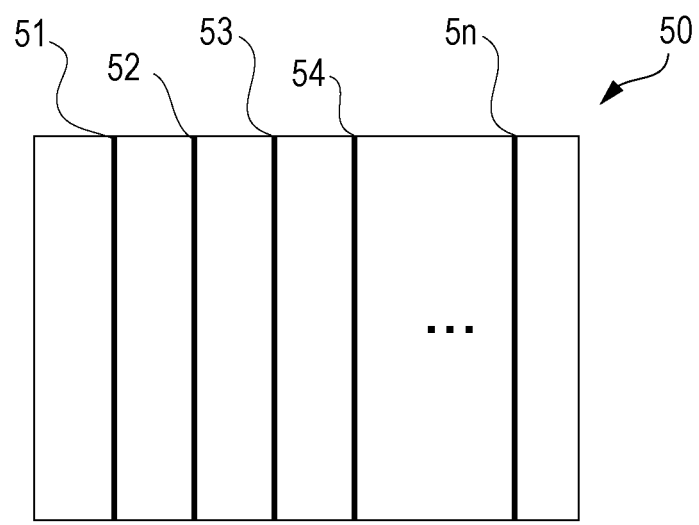
FIG. 6B is a diagram showing an image captured by a second camera in the light-section plane calibration step.
Figure 7:
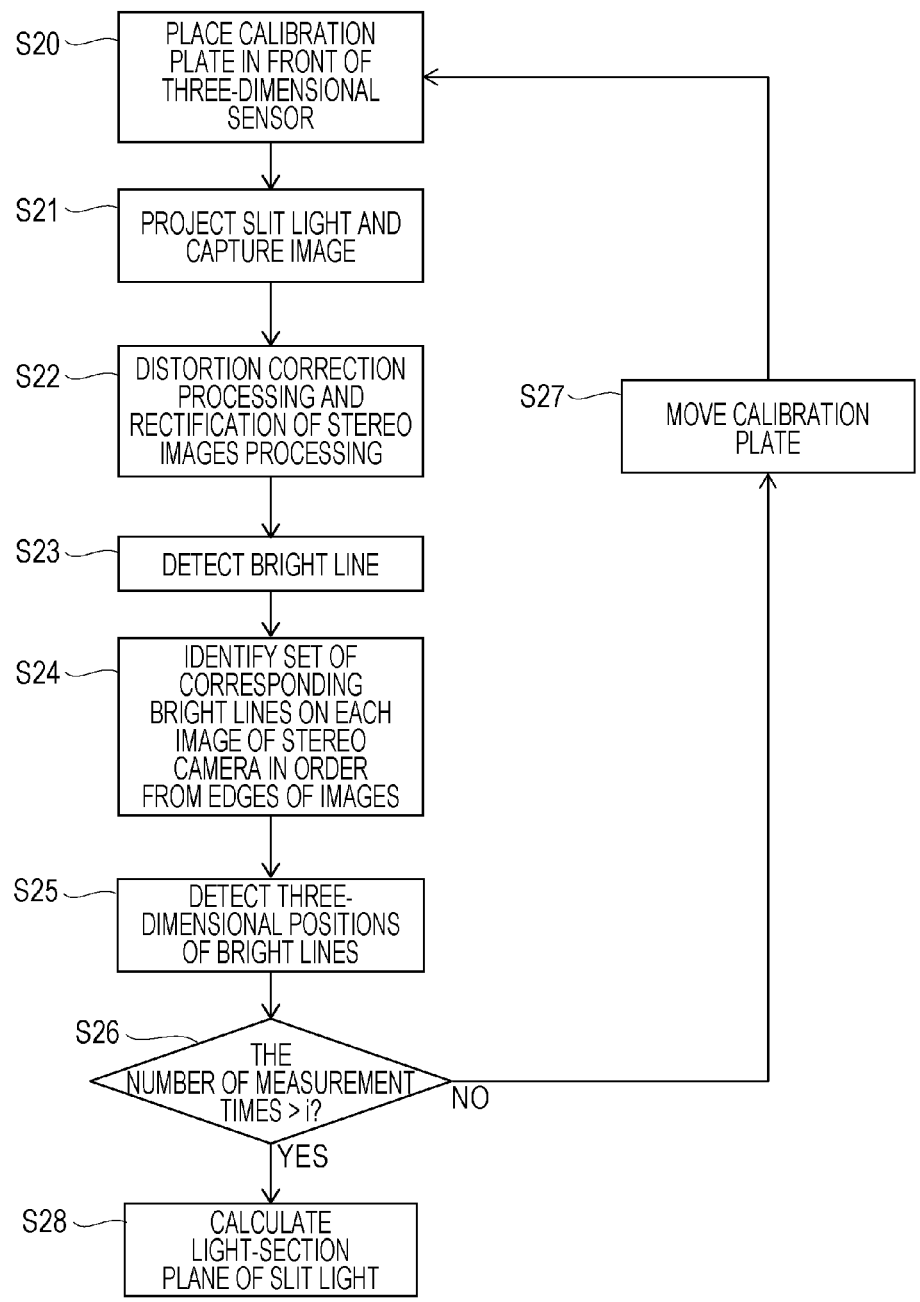
FIG. 7 is a flowchart showing the light-section plane calibration step.

When the calibration of the camera parameter 113 is completed, next, as shown in FIGS. 5 to 7, the three-dimensional measuring apparatus 1 calibrates the light-section plane 6Pj for each of a plurality of slit lights 6 (light-section plane calibration step). Specifically, as shown in FIG. 5, first, a calibration plate 15 which is used to calibrate the light-section plane and which has a plain single color such as black is placed instead of the work 2 (S20 in FIG. 7). Further, the multi-slit light 6 is projected from the pattern projector onto the calibration plate 15 and an image of the calibration plate is captured by the stereo camera 5 (S21 in FIG. 7).

Next, the image captured by the stereo camera 5 is transmitted to the control apparatus 10 and distortion correction processing and stereo images rectification processing are performed by the control apparatus 10 using the camera parameter 113 (S22 in FIG. 7). Specifically, the control apparatus 10 functions as a distortion correction—rectification of stereo images processing unit and corrects images 40 and 50 captured by the stereo camera 5 by using the camera parameter 113 as if the images were captured by the stereo camera 5 which has no lens distortion and in which the left and the right cameras are arranged in parallel. Thereby, in the images 40 and 50 of the first and the second cameras, a line (epipolar line) including a point on one image corresponding to a point on the other image is a line in parallel with the X axis on the same Y coordinate, so that a corresponding point is easily detected.

When the correction processing of the captured images is performed, the control apparatus 10 functions as a bright line detection unit and detects a bright lines $4n$ and $5n$ formed when the multi-slit light 6 is projected onto the calibration plate 15 from the images 40 and 50 on which the distortion correction processing and the stereo images rectification processing are performed (S23 in FIG. 7).

The pattern projector 7 is arranged to be perpendicular to the epipolar constraint of the stereo camera 5, so that the bright lines $4n$ and $5n$ have an angle near perpendicular to the epipolar line. Therefore, if the images are corrected by the distortion correction—rectification of stereo images processing unit, it is possible to detect points that form the bright lines $4n$ and $5n$ by detecting a peak from intensities of each pixel along the epipolar line, which is the X axis. Or, the points that form the bright lines may be detected by using a method such as binarization. After the points that form the bright lines are detected, the bright lines $4n$ and $5n$ can be detected by grouping the points adjacent to each other that form the bright lines. A too short bright line may be removed as noise by filtering the bright lines $4n$ and $5n$ detected here by the length thereof.

When the control apparatus 10 detects the bright lines $4n$ and $5n$ from the stereo images 40 and 50, as shown in FIGS. 6A and 6B, the control apparatus 10 assumes that the visual field of the stereo camera 5 is one plane. The control apparatus 10 identifies a set of corresponding bright lines $4n$ and $5n$ on the images captured by the stereo camera 5 between the cameras (S24 in FIG. 7). Specifically, by using the number of slits of the multi-slit light 6 and a fact that the calibration plate 15 is a plane, the control apparatus 10 identifies a set of corresponding bright lines $4n$ and $5n$ on the first and the second images of the stereo camera 5 in order from the edges of the images.

When a set of corresponding bright lines $4n$ and $5n$ is identified, the control apparatus 10 functions as a three-dimensional reconstruction unit and detects three-dimensional positions of the bright lines formed when the multi-slit light 6 is projected onto the calibration plate 15 (S25 in FIG. 7). In other words, the control apparatus 10 obtains the three-dimensional position of the bright line by a stereo method from the correspondence relationship between the bright line 4n on the first image and the bright line 5n on the second image by using the camera parameter 113.

When the three-dimensional position of the bright line is obtained, the control apparatus 10 determines whether or not the number of measurement times of the three-dimensional position of the bright line is greater than or equal to a predetermined number of measurement times i (S26 in FIG. 7). When the number of measurement times is smaller than the predetermined number of times i (NO in S26 in FIG. 7), the control apparatus 10 moves the position of the calibration plate 15 in the depth direction of the stereo camera 5 (S27 in FIG. 7) and repeats the process of steps S20 to S25 to measure again the three-dimensional position of the bright line.

On the other hand, when the number of measurement times is greater than or equal to the predetermined number of times i (YES in S26 in FIG. 7), the control apparatus 10 calculates the three-dimensional plane equation of the light-section plane 6Pj of each slit light 6X from the measurement result of the three-dimensional position of the bright line and stores the three-dimensional plane equation (S28 in FIG. 7). In other words, the bright line formed on the calibration plate by the multi-slit light 6 is present on the light-section plane of the multi-slit light 6. Therefore, the three-dimensional positions of the bright lines measured while moving the calibration plate 15 are present on the same plane for each slit and the control apparatus 10 calculates an approximate plane by collecting the three-dimensional positions of the bright lines obtained by a plurality of measurements for each slit, so that the control apparatus 10 obtains the three-dimensional plane equation.

When the camera calibration step S1 and the light-section plane calibration step S2 described above are completed, the advance preparation of the measurement of the three-dimensional measuring apparatus 1 is completed, so that it is possible to perform the three-dimensional measuring. The positional relationship among the first camera 5L, the second camera 5R, and the projector 7 is determined as described above. The bright line generated on or near the plane represented by the three-dimensional plane equation corresponding to the slit light projected by the projector 7 corresponds to an image of the bright line captured by the first camera 5L or an image of the bright line captured by the second camera 5R. Since the three-dimensional plane equation is determined corresponding to the slit light, as described later in detail, it is possible to easily identify a correspondence between the bright line whose image is captured by the first camera 5L and the bright line whose image is captured by the second camera 5R by using the image of the bright line whose image is captured by either one of the first and the second cameras and the three-dimensional plane. The advance preparation need not be performed for each measurement but may be achieved by only reading data stored in the storage apparatus 103 unless there is no change in the camera parameter 113, the positional relationship between the stereo camera 5 and the pattern projector 7, and the pattern of the pattern projector 7.

Next, the three-dimensional measuring step S3 in which the work 2 is actually measured will be described with reference to FIGS. 8 to 14B. When three-dimensionally measuring the work 2, first, the three-dimensional measuring apparatus 1 projects a plurality of slit lights 6 from the projector 7 onto the work 2 and captures images of the work 2 projected by the plurality of slit lights 6 by the first camera 5L and the second camera 5R. The control apparatus (arithmetic unit) 10 acquires the first and the second images 40 and 50 of the work 2 projected by the plurality of slit lights 6, which are captured from the different positions (S30 in FIG. 8, image acquisition step). This image capturing may be performed once for each measurement.

Figure 8:
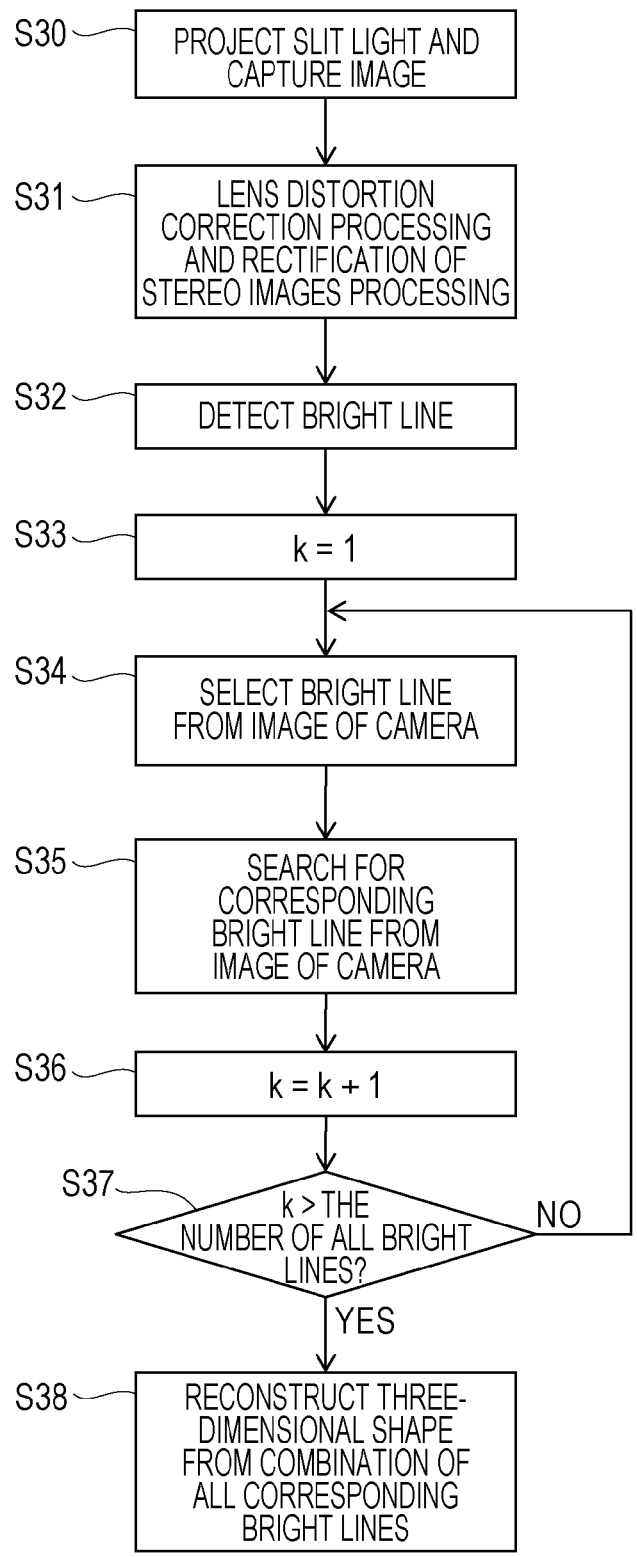
FIG. 8 is a flowchart showing a three-dimensional measuring step.

When the control apparatus 10 acquires the first and the second images 40 and 50, in the same manner as in the calibration of the light-section plane, the control apparatus 10 performs the distortion correction processing and the stereo images rectification processing on the first and the second images 40 and 50 (S31 in FIG. 8, correction step). Then, the control apparatus 10 detects the bright lines generated on the first image by the irradiation of the multi-slit light 6 and the bright lines generated on the second image by the irradiation of the multi-slit light 6 by using the corrected first and second images 40 and 50 (S32 in FIG. 8, bright line detection step).

When the control apparatus 10 detects the bright lines on the first and the second images, the control apparatus 10 selects one bright line from a plurality of bright lines on the first image (S33 and S34 in FIG. 8, bright line selection step). The control apparatus 10 obtains a bright line on the second image and a light-section plane which correspond to the selected bright line on the first image (S35 in FIG. 8, step of identifying a set of corresponding bright lines). In summary, the control apparatus 10 functions as a bright line correspondence detection unit and identifies a correspondence between the bright line on the first image and the bright line on the second image by using the camera parameter 113 and the three-dimensional plane equation of the light-section plane regarding the bright lines detected from the captured images of the stereo camera 5 that captures images of the work 2.

When one correspondence relationship among the bright line on the first image, the bright line on the second image, and the light-section plane is obtained, the control apparatus 10 obtains the above correspondence relationship regarding all the bright lines on the first image by using the same method (S33 to S37 in FIG. 8).

When the correspondence relationships regarding all the bright lines are obtained (YES in S37 in FIG. 8), the control apparatus 10 obtains the three-dimensional position of the work 2 by the principle of triangulation by using one of the correspondence relationships among the bright line on the first image, the bright line on the second image, and the light-section plane. The control apparatus 10 obtains data of the three-dimensional shape of the work 2 by obtaining the three-dimensional position (S38 in FIG. 8).

Step of Identify Set of Corresponding Bright Lines

Next, the step of identifying a set of corresponding bright lines S35 will be described in detail with reference to FIGS. 1 and 9 to 13. In the description below, any one of a plurality of bright lines generated on the first image captured by the first camera 5L by the irradiation of the slit light 6 is denoted by reference sign 4j. Also, any one of a plurality of bright lines generated on the second image captured by the second camera 5R by the irradiation of the slit light 6 is denoted by reference sign 5j. Further, any one of a plurality of light-section planes of the slit light 6 is denoted by reference sign 6Pj.

Figure 9:
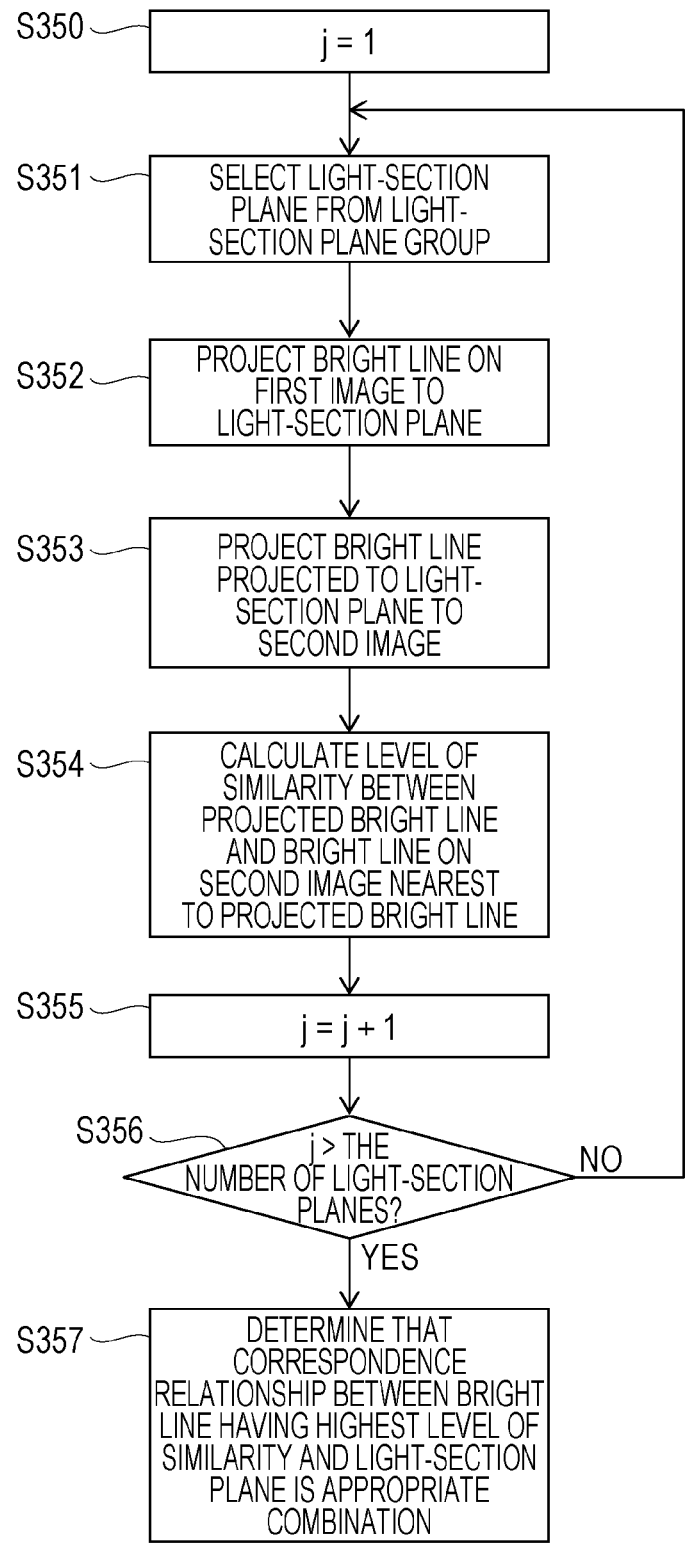
FIG. 9 is a flowchart showing a step of identifying a set of corresponding bright lines.

In the bright line selection step (S33 and S34 in FIG. 8), when one bright line 4j is selected from a plurality of bright lines on the first image, the control apparatus 10 temporarily identifies a correspondence between the selected bright line 4j on the first image and one of a plurality of light-section planes (S350 and S351 in FIG. 9, temporary identification step). In other words, the bright line 4j on a sensor surface (the first image) of the first camera 5L, which is desired to correspond to a light-section plane, is assumed to be generated by the light-section plane 6Pj which is the jth light-section plane (j is an arbitrary integer) of the light-section planes of the multi-slit light 6 stored in the storage apparatus 103.

When a correspondence between the bright line 4j on the first image and the light-section plane 6Pj is identified, the control apparatus 10 temporarily projects the selected bright line 4j on the first image onto the light-section plane 6Pj, whose correspondence with the bright line 4j is temporarily identified, in a three-dimensional space as shown in FIG. 1 (S352 in FIG. 9, light-section plane projection step). After the control apparatus 10 projects the bright line 4j onto the light-section plane 6Pj, the control apparatus 10 projects the bright line 4j on the first image onto the second image through the light-section plane 6Pj (S353 in FIG. 9, second image projection step). In summary, the control apparatus 10 performs calculation processing for projecting the bright line 4j on the first image onto the assumed light-section plane 6Pj in the three-dimensional space by using the three-dimensional plane equation of the light-section plane and the camera parameter and further projecting the projected bright line 4jP onto the second image (sensor surface of the second camera) 50.

Next, the control apparatus 10 detects the bright line 5j on the second image nearest to a bright line 4jX on the first image which is projected onto the second image and calculates a level of similarity M between the bright line 4jX on the first image which is projected onto the second image and the bright line 5j on the second image (S354 in FIG. 9, level of similarity calculation step).

Figure 10:
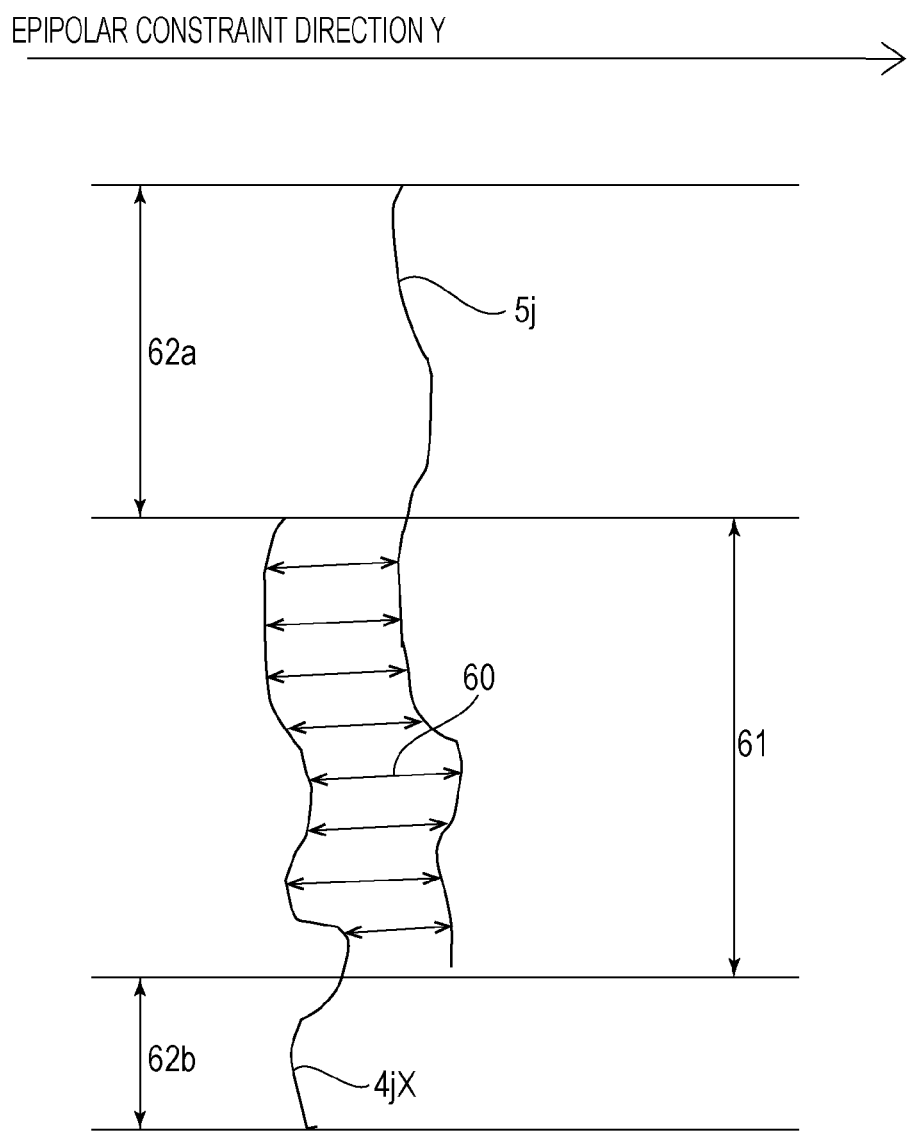
FIG. 10 is a schematic diagram for explaining a calculation method of a level of similarity of bright lines.

More specifically, as shown in FIG. 10, the level of similarity M is evaluated by one or a combination of an average value 60A of distances 60 in an epipolar constraint direction Y, an overlapped length 61 in a direction X perpendicular to the epipolar constraint, and distances 62a and 62b between end points. The epipolar constraint direction Y is the horizontal direction in an image corrected by the distortion correction and stereo images rectification processing. The level of similarity M may be evaluated by using a degree of similarity of image features (average intensity, contrast, and the like) around the bright line.

When the level of similarity M in one combination of the bright line 4j on the first image and the light-section plane 6Pj whose correspondence is temporarily identified is calculated, the control apparatus 10 changes the light-section plane 6Pj whose correspondence with the bright line 4j on the first image is identified. Then the control apparatus 10 repeats the processes from the temporary identification step S351 to the level of similarity calculation step S354 and calculates the level of similarity M of combinations of the bright line 4j and the light-section plane 6Pj whose correspondence is newly identified.

The control apparatus 10 repeats the above processes, and when the degrees of coincidence M are obtained for combinations of the bright line 4j and all the light-section planes, the control apparatus 10 determines whether or not the bright line 4j on the first image and each light-section plane 6Pj correspond to each other appropriately on the basis of the calculated degrees of coincidence M. Thereby, the control apparatus 10 determines a correct combination between the bright line 4j and the light-section plane 6Pj (S357, determination step). Also, at this time, a correct combination of the bright line 5j on the second image, the bright line 4j on the first image, and the light-section plane 6Pj is determined. The control apparatus 10 obtains correspondence relationships among the light-section plane 6Pj, the bright line 5j on the second image, and the bright line 4j on the first image for all the bright lines 4j on the first image by the method described above.

In this way, the control apparatus 10 virtually projects the bright line 4j on the first image onto the second image through light-section plane 6Pj and obtains the bright line 4jX on the first image which is projected onto the second image. The control apparatus 10 can determine a result of identified correspondence relationship among the bright line 4j on the first image, the light-section plane 6Pj, and the bright line 5j on the second image by using the level of similarity M between the calculated bright line 4jX on the first image and the bright line 5j on the second image which is actually captured as an index.

More specifically, lines connecting the optical centers $O_{5L}$ and $O_{5R}$ of the first and the second cameras 5L and 5R and the bright lines 4j and 5j on the sensor surfaces 40 and 50 and the light-section plane 6Pj of the slit light intersect each other in one line. When all the correspondence relationships among the bright line 4j on the first image, the light-section plane 6Pj, and the bright line 5j on the second image are appropriate, these are a position of a bright line L formed when the work 2 is projected by the slit light.

The control apparatus 10 obtains an appropriate correspondence relationship among the bright line 4j on the first image, the bright line 5j on the second image, and the light-section plane 6Pj by using the above relationships. When the bright line 4j on an image of one camera is projected onto the light-section plane 6Pj and thereafter the projected bright line 4jP is further projected onto an image of the opposite side camera, there should be the bright line 5j whose position corresponds to the position of the further projected bright line 4jP on the image captured by the opposite side camera. Therefore, the above projection is performed on the light-section plane 6Pj whose correspondence with the bright line 4j is temporarily identified and whether or not there is a corresponding bright line is determined, so that it is possible to determine whether or not the temporary identification of the light-section plane 6Pj is appropriate.

According to the above method, it is possible to identify a correspondence between the bright lines 4j and 5j on the images and the light-section plane 6Pj by a method other than the recognition of the bright lines by color, so that it is possible to perform three-dimensional measuring of a work to which a plurality of slit lights are projected by using a single color slit light pattern and by one-time image capturing.

Since a pattern light source of a single color can be used, it is possible to reduce the cost of the pattern light source. Further, since there is no intensity degradation of the light source by a color filter, it is not necessary to increase the intensity of the light source more than necessary. Furthermore, a high accuracy of pattern for preventing the bright lines of each color from overlapping each other is not required.

Since a monochrome camera can be used as the stereo camera 5, higher sensitivity and higher definition can be realized compared with a case in which a color camera is required. In addition, since the three-dimensional measuring can be performed by one-time image capturing, it is possible to perform the measuring in a short time, so that a moving object on a production line can also be measured.

Other Possibility of identifying a Set of Corresponding Bright Lines

In the three-dimensional measuring of the work 2, a bright line on an image generated by the same slit light may be divided and bright lines formed by different slit lights may be a connected bright line on the captured image due to unevenness of the shape of the work 2, noise of the captured image, and the like. Therefore, when detecting the level of similarity M, if the divided lines are recognized or a bright line formed by different bright lines connected with each other is recognized as one bright line, the level of similarity M may not be detected correctly.

Therefore, when the control apparatus 10 calculates the level of similarity M, after identifying a correspondence between the bright line 4jX on the first image and the bright line 5j on the second image, the control apparatus 10 may divides the bright lines 4jX and 5j in a direction perpendicular to the epipolar constraint (bright line division step).

For example, a part of the bright line on the image may be divided as shown by the bright line 5j in FIG. 11(a) or may not be properly projected onto the image as shown by the bright line 4jX. Therefore, after a correspondence between the bright lines 4jX and 5j is identified, as shown in FIG. 11(b), regarding the both bright lines, the control apparatus 10 separates portions other than the portions $4jX_1$ and $5j_1$ that overlap each other in the direction perpendicular to the epipolar constraint and defines the separated portions as new bright lines $4jX_2$ and $5j_2$. The control apparatus 10 identifies a set of corresponding newly defined lines $4jX_2$ and $5j_2$ and calculates the level of similarity, so that the control apparatus 10 can correctly calculate the level of similarity M.

Figure 11:
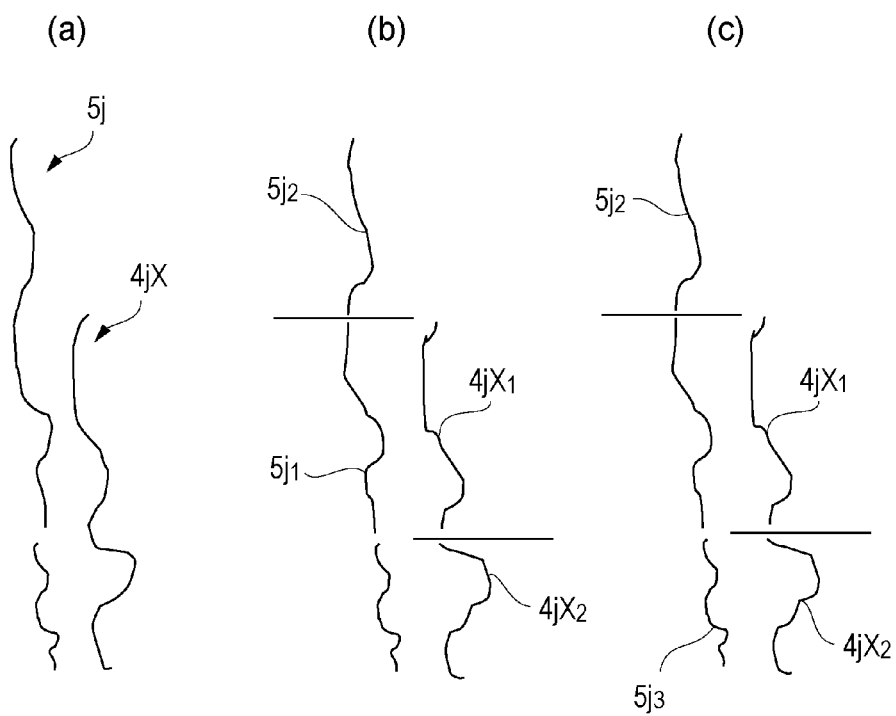
FIG. 11 is a schematic diagram for explaining a division method of bright lines, (a) is a diagram showing a state in which a correspondence between the bright lines is identified, (b) is a diagram showing a state in which the bright lines are divided, and (c) is a diagram showing a state in which a correspondence between newly divided bright lines is identified.

For example, in the case of FIG. 11, the control apparatus 10 identifies a set of the corresponding overlapped portions $4jX_1$ and $5j_1$ of the bright lines which are originally selected and calculates the level of similarity $M_1$. Also, the control apparatus 10 identifies a correspondence between the separated bright line $4jX_2$ and a bright line $5j_3$ appearing on the second image as another bright line and calculates the level of similarity $M_2$. The control apparatus 10 may calculate the average of the calculated degrees of coincidence $M_1$ and $M_2$ to obtain the level of similarity M. Since the bright line $5j_2$ has no bright line whose correspondence with the bright line $5j_2$ is identified, so that a correspondence between the bright line $5j_2$ and any bright line is not identified.

Figure 12:
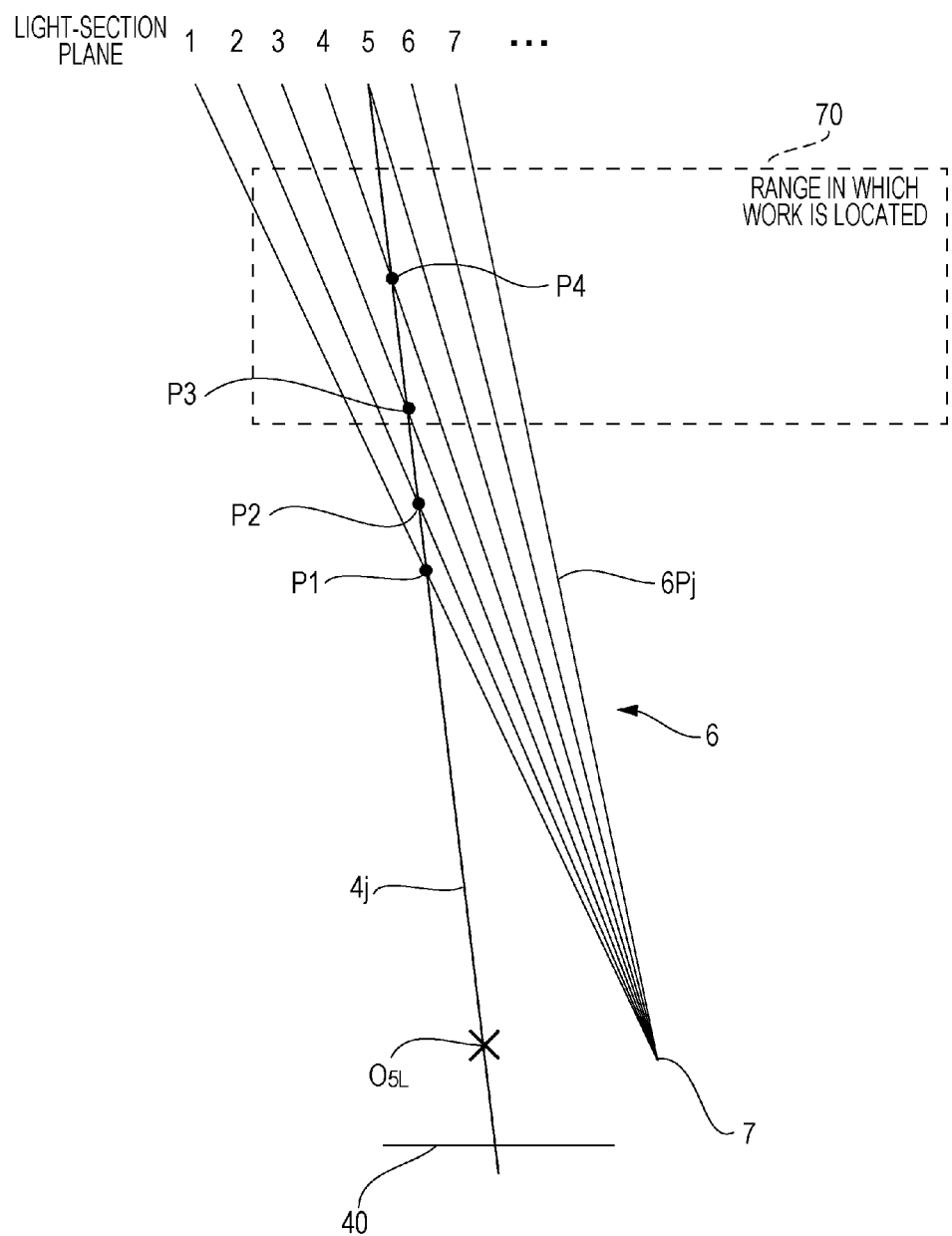
FIG. 12 is a schematic diagram showing a method for determining light-section planes where the level of similarity is calculated.

In the embodiment described above, the level of similarity M is calculated for correspondence relationships between the bright line 4j on the first image and all the light-section planes 6Pj, and the correspondence relationship having the highest level of similarity M among a plurality of calculated degrees of coincidence M is defined as the appropriate correspondence relationship. However, as shown in FIG. 12, when the level of similarity M is calculated, if the bright line 4j on the first image is projected onto one of the light-section planes 6Pj whose correspondence with the bright line 4j is temporarily identified in the three-dimensional virtual space, the three-dimensional position at that time is obtained. As described above, the range in which the work 2 is located is set in advance. Therefore, if the three-dimensional position of the bright line 4j when the bright line 4j on the first image is projected onto one of the light-section planes 6Pj whose correspondence with the bright line 4j is temporarily identified is out of the three-dimensional range in which the work 2 is located, the control apparatus 10 may change the light-section plane 6Pj whose correspondence with the bright line 4j is identified without calculating the level of similarity M. In other words, the control apparatus 10 may have a level of similarity calculation determination step that determines whether or not to calculate the level of similarity M.

Specifically, in the case of FIG. 12, the control apparatus 10 calculates the level of similarity M only for the third and the fourth light-section planes (intersection points P3 and P4) where an intersection point (three-dimensional position) between the bright line 4j on the first image and the light-section plane 6Pj is within a range 70 in which the work 2 is located. The control apparatus 10 does not calculate the level of similarity M for the other light-section planes and completes the process after the light-section plane projection step (S352 in FIG. 9). By doing so, it is not necessary to calculate the level of similarity M for light-section planes that cannot be a candidate whose correspondence is identified, so that the amount of calculation is reduced and a correspondence of the bright line is quickly identified. Therefore, it is possible to shorten a measurement takt time.

Further, to perform the processing for identifying a correspondence of the bright line more quickly, light-section plane candidates whose correspondence with the bright line may be identified are stored for each area obtained by dividing the image or for each pixel. When a correspondence between the bright line and a light-section plane is identified, a correspondence between the bright line and only the light-section plane candidates corresponding to the position of the detected bright line on the image may be temporarily identified (light-section plane selection step).

Figure 13:
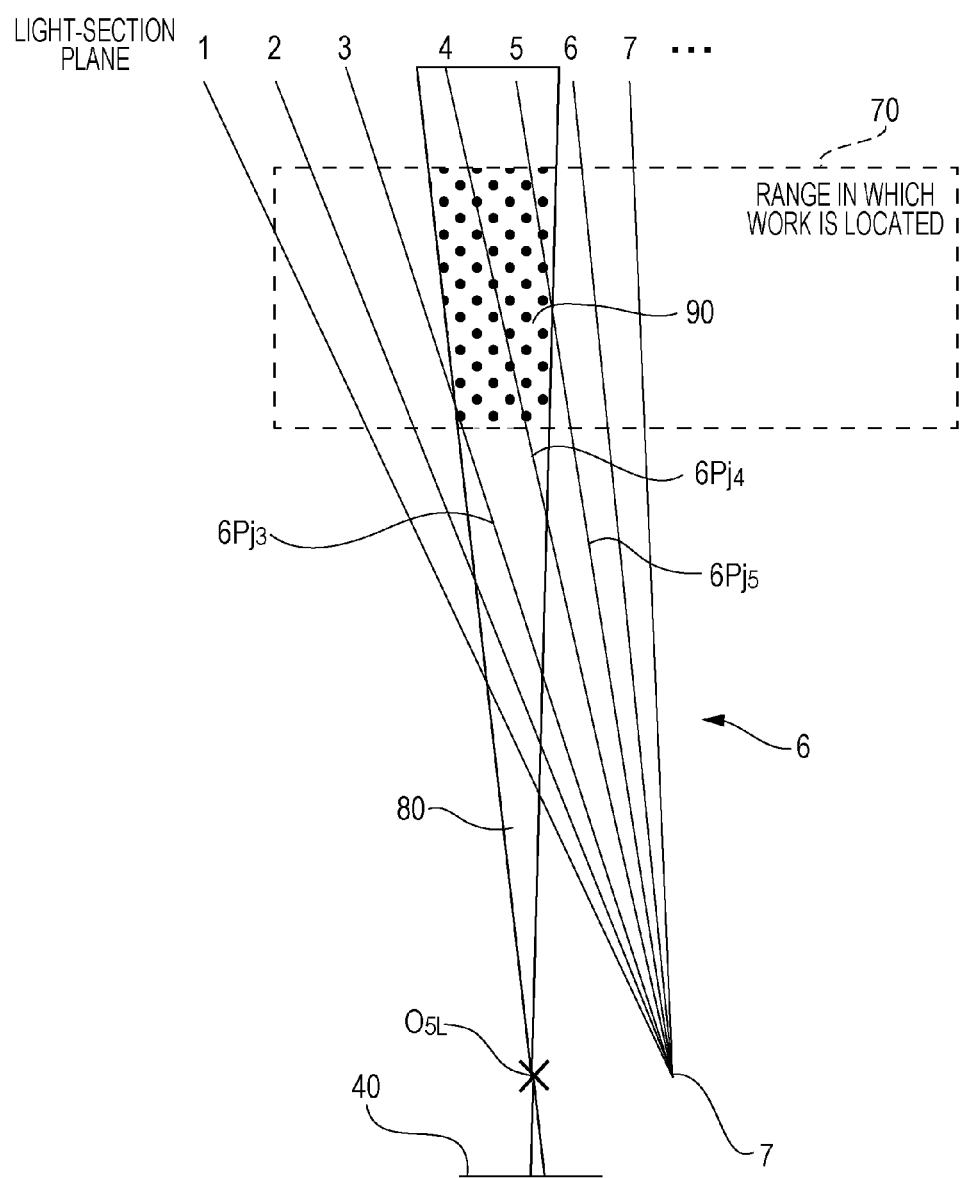
FIG. 13 is a schematic diagram showing a method for selecting a light-section plane whose correspondence with the bright line is identified.

Specifically, as described above, the positional relationship among the first camera 5L, the second camera 5R, and the projector 7 is calibrated in advance and the range 70 in which the work is located is set in advance. Therefore, as shown in FIG. 13, it is possible to define what range of a range 80 on the first image 40 overlaps the range 70 in which the work is located in the virtual three-dimensional space. In other words, it can be said that the predetermined range 80 on the first image captures an image of an overlapped portion 90 with the range 70 in which the work is located on a three-dimensional virtual zone.

Also, the three-dimensional plane equation of the light-section plane 6Pj of each slit light is known. Therefore, when the bright line 4j is present in the range 80 on the first image in FIG. 13, it can be said that the bright line 4j is a bright line generated by one of the light-section planes $6Pj_3$ to $6Pj_5$ which pass through the overlapped portion 90.

Figure 14A:
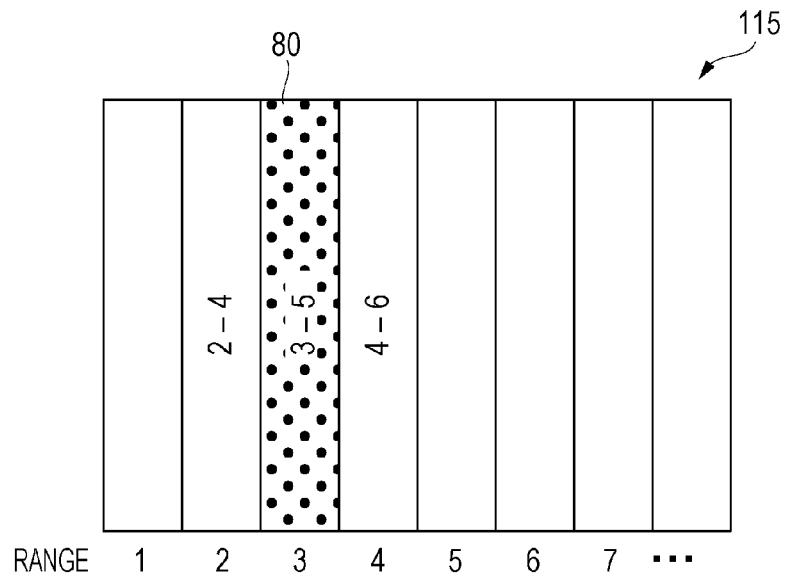
FIG. 14A is a diagram showing a light-section plane search image.
Figure 14B:
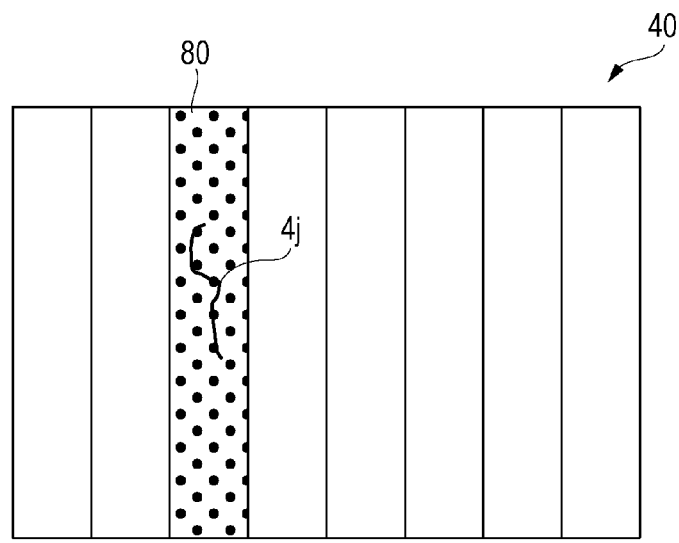
FIG. 14B is a diagram showing a correspondence relationship between the light-section plane search image and a first image.

Therefore, as shown in FIG. 14A, when the control apparatus 10 detects a bright line on the first image 40, the control apparatus 10 creates a light-section plane search image (candidate index data 115) in which a number of the light-section plane is recorded on pixels where a bright line on the image is present. As shown in FIG. 14B, when the control apparatus 10 detects the bright line 4j from the first image 40, the control apparatus 10 may determine the light-section plane 6Pj whose correspondence with bright line 4j is temporarily identified by using the light-section plane search image 115. The control apparatus 10 may create the light-section plane search image 115 for the second image and determine the light-section plane 6Pj whose correspondence with bright line 4j is identified when projecting the bright line 4j on the first image onto the second image.

In summary, the control apparatus 10 temporarily identifies a correspondence between only the light-section planes that pass through a range, in which the predetermined three-dimensional range 70 in which the work is located and the three-dimensional range 80 corresponding to the range in which a bright line is present on the first image overlap each other, among a plurality of light-section planes, and the bright line on the first image. The control apparatus 10 may calculate the level of similarity M for the set of light-section planes whose correspondence with the bright line is identified.

In the embodiment described above, although a monochrome camera is used as the stereo camera 5, a color camera may be used. A color light source may be used for the projector 7. When the color camera and the color light source are used, it is possible to use a combination of the identification of the correspondence of the bright line by color and the identification the correspondence of the bright line of the present invention.

Further, the intervals of the slits of the projector 7 may be constant or may be inconstant. When a correspondence among the bright line 4j on the first image, the bright line 5j on the second image, and the light-section plane 6Pj is identified, the three-dimensional measuring method may be any method that uses the principle of triangulation, such as the stereo method and the light-section method.

Further, although the three-dimensional measuring apparatus 1 may be used as a stand-alone three-dimensional measuring apparatus that measures a shape and orientation of an object, the three-dimensional measuring apparatus 1 may be included in an apparatus such as an automatic assembly robot, for example, the three-dimensional measuring apparatus 1 may be attached to the end of a robot arm.

Of course, the inventions described in the present embodiment, such as the bright line division step, the level of similarity calculation determination step, the light-section plane selection step, and the like, may be combined in any way.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

REFERENCE SIGNS LIST

1 Three-dimensional measuring apparatus
2 Work
4j Bright line generated on first image
5L First camera
5R Second camera
5j Bright line generated on second image
6X Slit light
6Pj light-section plane
7 Projector
10 Control apparatus

The invention claimed is:

1. A three-dimensional measuring apparatus comprising:
a projector configured to project slit light onto a work; a first camera configured to capture an image of the work projected by the slit light;
a second camera configured to capture an image of the work projected by the slit light from a position different from that of the first camera; and
a control apparatus configured to store a three-dimensional plane equation of a light-section plane of the slit light, identify a correspondence among a bright line generated on a first image captured by the first camera by projecting the slit light, a bright line generated on a second image captured by the second camera by projecting the slit light, and the three-dimensional plane equation of the light-section plane, and perform three-dimensional measuring of the work by a principle of triangulation by using a correspondence relationship among any of the bright line on the first image, the bright line on the second image, and the light-section plane,
wherein the control apparatus temporarily identifies a correspondence between the bright line on the first image and the light-section plane, temporarily projects the bright line on the first image onto the light-section plane in a three-dimensional virtual space, and thereafter projects the bright line onto the second image captured by the second camera through the light-section plane, and identifies a correspondence among the light-section plane and the bright lines on the images of the first and the second cameras on the basis of a level of similarity between the bright line on the first image which is projected onto the second image and the bright line on the second image.

2. The three-dimensional measuring apparatus according to claim 1, wherein
the projector projects a plurality of slit lights onto the work, and the control apparatus temporarily identifies a correspondence between only the light-section planes that pass through a range, in which a predetermined three-dimensional range in which the work is located and a three-dimensional range corresponding to a range in which the bright line is present on the first image overlap each other, among a plurality of the light-section planes, and the bright line on the first image, and calculates the level of similarity.

3. The three-dimensional measuring apparatus according to claim 1, wherein
if a three-dimensional position of the bright line when the bright line on the first image is projected onto one of the light-section planes whose correspondence is temporarily identified in a three-dimensional virtual space is out of a predetermined three-dimensional range in which the work is located, the control apparatus changes the light-section plane whose correspondence is to be identified without calculating the level of similarity.

4. A three-dimensional measuring method in which slit lights are projected from a projector onto a work and three-dimensional measuring of the work is performed by using a captured image of the work projected by the slit lights and three-dimensional plane equations of light-section planes of the plurality of slit lights, the method comprising:
an image acquisition step in which an arithmetic unit acquires a first image and a second image of the work projected by the plurality of slit lights, which are captured from different positions;
a step of identifying a set of corresponding bright lines in which the arithmetic unit determines an identification of a correspondence among each bright line on the first and the second images and the three-dimensional plane equations of the light-section planes; and
a measuring step in which the arithmetic unit performs three-dimensional measuring of the work by a principle of triangulation by using a correspondence relationship between any of the bright line on the first image, the bright line on the second image, and the light-section planes,
wherein the step of identifying a set of corresponding bright lines temporarily identifies a correspondence between each bright line on the first image and one of the light-section planes of the plurality of slit lights, temporarily projects the bright line on the first image onto the corresponding light-section plane in a three-dimensional virtual space, and thereafter projects the bright line onto the second image through the light-section plane, and determines whether or not the light-section plane and the bright lines on the first and the second images appropriately correspond to each other on the basis of a level of similarity between the bright line on the first image which is projected onto the second image and the bright line on the second image.

5. A non-transitory recording medium storing a program causing a computer to execute the steps of a three-dimensional measuring method in which slit lights are projected from a projector onto a work and three-dimensional measuring of the work is performed by using a captured image of the work projected by the slit lights and three-dimensional plane equations of light-section planes of the plurality of slit lights, the method comprising:

an image acquisition step in which an arithmetic unit acquires a first image and a second image of the work projected by the plurality of slit lights, which are captured from different positions;

a step of identifying a set of corresponding bright lines in which the arithmetic unit determines an identification of a correspondence among each bright line on the first and the second images and the three-dimensional plane equations of the light-section planes; and a measuring step in which the arithmetic unit performs three-dimensional measuring of the work by a principle of triangulation by using a correspondence relationship between any of the bright line on the first image, the bright line on the second image, and the light-section planes, wherein the step of identifying a set of corresponding bright lines temporarily identifies a correspondence between each bright line on the first image and one of the light-section planes of the plurality of slit lights, temporarily projects the bright line on the first image onto the corresponding light-section plane in a three-dimensional virtual space, and thereafter projects the bright line onto the second image through the light-section plane, and determines whether or not the light-section plane and the bright lines on the first and the second images appropriately correspond to each other on the basis of a level of similarity between the bright line on the first image which is projected onto the second image and the bright line on the second image.

* * * * *